United States Patent
Rivera

(10) Patent No.: US 9,271,597 B2
(45) Date of Patent: *Mar. 1, 2016

(54) SINGLE SERVING REUSABLE BREWING MATERIAL HOLDER

(75) Inventor: Adrian Rivera, Whittier, CA (US)

(73) Assignee: ARM Enterprises, Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/436,667

(22) Filed: Mar. 30, 2012

(65) Prior Publication Data

US 2012/0207895 A1 Aug. 16, 2012

Related U.S. Application Data

(63) Continuation-in-part of application No. 12/620,584, filed on Nov. 17, 2009, now Pat. No. 8,291,812, and a continuation-in-part of application No. 12/610,181, filed on Oct. 30, 2009, and a continuation-in-part of application No. 11/777,831, filed on Jul. 13, 2007, now abandoned.

(51) Int. Cl.
| | |
|---|---|
| A23G 1/10 | (2006.01) |
| A47J 31/00 | (2006.01) |
| A47J 31/44 | (2006.01) |
| A47J 31/06 | (2006.01) |

(52) U.S. Cl.
CPC .................................. *A47J 31/0689* (2013.01)

(58) Field of Classification Search
CPC . A47J 31/407; A47J 31/4403; A47J 31/4407; A47J 31/3628; A47J 31/368; B65D 85/8043; B65D 85/8046; A23F 5/262; A23F 3/18; A23F 3/14; A23F 5/18; A23F 5/243

USPC ............ 99/279, 485, 287, 289 R, 295, 302 R, 99/306, 323; 426/77–80, 112, 115, 132, 426/135, 394

See application file for complete search history.

(56) References Cited

U.S. PATENT DOCUMENTS

| | | | |
|---|---|---|---|
| 2,433,815 A | | 12/1947 | Laforge |
| 3,022,411 A | * | 2/1962 | Soper et al. .................... 219/441 |
| 3,115,822 A | | 12/1963 | Totten |
| 3,120,170 A | | 2/1964 | Garte |
| 3,136,241 A | | 6/1964 | Price |
| 3,199,682 A | | 8/1965 | Scholtz |
| 3,224,360 A | * | 12/1965 | Wickenberg et al. ........... 99/292 |

(Continued)

FOREIGN PATENT DOCUMENTS

WO WO 2005/092160 A1 10/2005

*Primary Examiner* — Eric Stapleton
(74) *Attorney, Agent, or Firm* — IP Strategies

(57) ABSTRACT

A single serving beverage filter cartridge is formed by placing a single serving portion of brewing material into a reusable coffee holder having a lid and a base. The reusable coffee holder includes a recessed annular region at the bottom of a base of the holder and is insertable into a cartridge housing of a single serving coffee maker having an offset needle reaching up vertically from the base of the housing, the recessed annular region avoiding the offset bottom needle. The coffee holder defines a frustoconical exterior and includes mesh filtering material for retaining brewing material inside the coffee holder. The mesh material may be a metal mesh or plastic mesh. The reusable coffee holder is configured for use in single serving coffee makers having the offset bottom needle and designed for single use cartridges.

36 Claims, 4 Drawing Sheets

(56) References Cited

U.S. PATENT DOCUMENTS

| | | | | |
|---|---|---|---|---|
| 3,316,388 | A * | 4/1967 | Wickenberg et al. | 219/442 |
| 3,336,857 | A * | 8/1967 | Knodt et al. | 99/296 |
| 3,384,004 | A | 5/1968 | Perlman et al. | |
| 3,403,617 | A * | 10/1968 | Lampe | 99/295 |
| 3,405,630 | A * | 10/1968 | Weber, III | 99/282 |
| 3,583,308 | A | 6/1971 | Williams | |
| 3,592,126 | A * | 7/1971 | Dombrowik | 99/312 |
| 3,607,297 | A | 9/1971 | Fasano | |
| 3,695,168 | A * | 10/1972 | Van Brunt | 99/306 |
| 3,757,670 | A * | 9/1973 | Laama et al. | 99/302 R |
| 3,844,206 | A * | 10/1974 | Weber | 99/282 |
| 3,948,157 | A * | 4/1976 | Layre | 99/289 R |
| 3,958,502 | A * | 5/1976 | Vitous | 99/300 |
| 4,052,318 | A * | 10/1977 | Krebs | 210/337 |
| 4,086,848 | A * | 5/1978 | Hahn | 99/323 |
| 4,143,590 | A * | 3/1979 | Kasakoff | 99/296 |
| 4,164,644 | A * | 8/1979 | Remsnyder et al. | 219/433 |
| 4,221,670 | A * | 9/1980 | Ziemek | 210/474 |
| 4,253,385 | A | 3/1981 | Illy | |
| 4,286,515 | A | 9/1981 | Baumann et al. | |
| 4,510,853 | A * | 4/1985 | Takagi | 99/286 |
| 4,550,024 | A * | 10/1985 | le Granse | 426/77 |
| 4,603,621 | A * | 8/1986 | Roberts | 99/307 |
| 4,703,687 | A * | 11/1987 | Wei | 99/286 |
| 4,704,954 | A * | 11/1987 | Mollenhoff | 99/279 |
| 4,706,555 | A * | 11/1987 | Nakamura et al. | 99/283 |
| 4,721,835 | A * | 1/1988 | Welker | 219/689 |
| 4,739,697 | A * | 4/1988 | Roberts | 99/295 |
| 4,832,845 | A * | 5/1989 | Hendretti | 210/470 |
| 4,833,979 | A * | 5/1989 | Garulli et al. | 99/287 |
| 4,858,523 | A * | 8/1989 | Helbling | 99/280 |
| 4,865,737 | A * | 9/1989 | McMichael | 210/477 |
| 4,967,648 | A * | 11/1990 | Helbling | 99/280 |
| 4,986,172 | A * | 1/1991 | Hunnicutt, Jr. | 99/306 |
| 4,998,463 | A * | 3/1991 | Precht et al. | 99/300 |
| 5,000,082 | A * | 3/1991 | Lassota | 99/304 |
| 5,012,059 | A * | 4/1991 | Boatman | 219/689 |
| 5,028,328 | A * | 7/1991 | Long | 210/477 |
| 5,046,409 | A * | 9/1991 | Henn | 99/307 |
| 5,072,660 | A * | 12/1991 | Helbling | 99/280 |
| 5,123,335 | A | 6/1992 | Aselu | |
| 5,190,653 | A * | 3/1993 | Herrick et al. | 210/477 |
| 5,233,914 | A | 8/1993 | English | |
| 5,242,702 | A * | 9/1993 | Fond | 426/433 |
| 5,265,517 | A * | 11/1993 | Gilbert | 99/280 |
| 5,287,797 | A * | 2/1994 | Grykiewicz et al. | 99/295 |
| 5,325,765 | A * | 7/1994 | Sylvan et al. | 99/295 |
| 5,335,589 | A | 8/1994 | Yerves et al. | |
| 5,343,799 | A * | 9/1994 | Fond | 99/295 |
| 5,347,916 | A * | 9/1994 | Fond et al. | 99/295 |
| 5,363,745 | A * | 11/1994 | Lin | 99/306 |
| 5,398,596 | A * | 3/1995 | Fond | 99/295 |
| 5,401,328 | A * | 3/1995 | Schmitz | 134/58 R |
| 5,403,605 | A * | 4/1995 | Smith et al. | 426/433 |
| 5,406,882 | A * | 4/1995 | Shaanan | 99/287 |
| 5,463,932 | A * | 11/1995 | Olson | 99/280 |
| 5,490,448 | A * | 2/1996 | Weller et al. | 99/305 |
| 5,526,733 | A | 6/1996 | Klawuhn et al. | |
| 5,531,152 | A * | 7/1996 | Gardosi | 99/289 R |
| 5,562,941 | A * | 10/1996 | Levy | 426/433 |
| 5,582,730 | A | 12/1996 | Hugentobler | |
| 5,582,731 | A * | 12/1996 | Gianfranco | 210/477 |
| 5,635,233 | A * | 6/1997 | Levinson | 426/433 |
| 5,636,563 | A * | 6/1997 | Oppermann et al. | 99/285 |
| 5,669,287 | A * | 9/1997 | Jefferson et al. | 99/299 |
| 5,676,041 | A | 10/1997 | Glucksman et al. | |
| 5,775,206 | A * | 7/1998 | St-Gelais | 99/323 |
| 5,829,340 | A | 11/1998 | Yang | |
| 5,840,189 | A * | 11/1998 | Sylvan et al. | 210/474 |
| 5,865,094 | A * | 2/1999 | Kealy | 99/291 |
| 5,870,943 | A | 2/1999 | Levi et al. | |
| 5,887,510 | A * | 3/1999 | Porter | 99/287 |
| 5,897,899 | A * | 4/1999 | Fond | 426/112 |
| 5,924,563 | A * | 7/1999 | Salyers | 206/223 |
| 5,932,260 | A * | 8/1999 | Soughan | 426/78 |
| 6,065,609 | A * | 5/2000 | Lake | 210/474 |
| D431,423 | S * | 10/2000 | Ohm et al. | D7/620 |
| 6,136,352 | A | 10/2000 | Silverstein et al. | |
| 6,189,438 | B1 * | 2/2001 | Bielfeldt et al. | 99/321 |
| RE37,173 | E * | 5/2001 | Jefferson et al. | 99/299 |
| 6,227,102 | B1 * | 5/2001 | Sham et al. | 99/286 |
| 6,231,909 | B1 * | 5/2001 | Levinson | 426/433 |
| 6,250,209 | B1 * | 6/2001 | Pope | 99/323 |
| 6,253,662 | B1 * | 7/2001 | Zelson | 99/279 |
| 6,263,781 | B1 * | 7/2001 | Calagui | 99/323 |
| D454,433 | S | 3/2002 | Peter | |
| D454,434 | S | 3/2002 | McDaniel et al. | |
| 6,440,256 | B1 | 8/2002 | Gordon et al. | |
| D474,110 | S | 5/2003 | Sweeney | |
| D474,111 | S | 5/2003 | Lazaris | |
| 6,589,577 | B2 | 7/2003 | Lazaris et al. | |
| 6,606,938 | B2 | 8/2003 | Taylor | |
| 6,607,762 | B2 | 8/2003 | Lazaris et al. | |
| 6,645,537 | B2 | 11/2003 | Sweeney et al. | |
| 6,655,260 | B2 * | 12/2003 | Lazaris et al. | 99/295 |
| 6,658,989 | B2 | 12/2003 | Sweeney et al. | |
| 6,662,955 | B1 * | 12/2003 | Lassota | 210/482 |
| 6,708,600 | B2 * | 3/2004 | Winkler et al. | 99/295 |
| 6,727,484 | B2 * | 4/2004 | Policappelli | 219/689 |
| 6,740,345 | B2 * | 5/2004 | Cai | 426/77 |
| 6,758,130 | B2 * | 7/2004 | Sargent et al. | 99/295 |
| 6,786,136 | B2 * | 9/2004 | Cirigliano et al. | 99/323 |
| 6,832,542 | B2 | 12/2004 | Hu et al. | |
| 6,843,165 | B2 | 1/2005 | Stoner et al. | |
| D502,362 | S | 3/2005 | Lazaris et al. | |
| 6,904,840 | B1 | 6/2005 | Pfeifer et al. | |
| 6,948,420 | B2 | 9/2005 | Kirschner et al. | |
| 6,968,775 | B2 * | 11/2005 | Burrows et al. | 99/303 |
| 7,047,870 | B2 | 5/2006 | Gantt et al. | |
| 7,081,263 | B2 | 7/2006 | Albrecht | |
| 7,131,369 | B2 | 11/2006 | Gantt et al. | |
| 7,320,274 | B2 * | 1/2008 | Castellani | 99/295 |
| 7,730,829 | B2 * | 6/2010 | Hammad | 99/295 |
| 7,946,217 | B2 * | 5/2011 | Favre et al. | 99/295 |
| 8,047,127 | B2 | 11/2011 | Lin | |
| 8,087,347 | B2 * | 1/2012 | Halliday et al. | 99/295 |
| 2001/0043954 | A1 * | 11/2001 | Sweet | 424/725 |
| 2002/0005367 | A1 * | 1/2002 | Zelson | 206/449 |
| 2002/0023543 | A1 * | 2/2002 | Schmed | 99/295 |
| 2002/0035929 | A1 * | 3/2002 | Kanba et al. | 99/279 |
| 2002/0048621 | A1 * | 4/2002 | Boyd et al. | 426/77 |
| 2002/0059870 | A1 * | 5/2002 | Walters Jr. et al. | 99/298 |
| 2002/0078831 | A1 * | 6/2002 | Cai | 99/295 |
| 2002/0144604 | A1 * | 10/2002 | Winkler et al. | 99/302 R |
| 2002/0148356 | A1 * | 10/2002 | Lazaris et al. | 99/295 |
| 2003/0006185 | A1 * | 1/2003 | Hepler | 210/464 |
| 2003/0041739 | A1 * | 3/2003 | Cai | 99/287 |
| 2003/0167928 | A1 * | 9/2003 | Mulle et al. | 99/279 |
| 2003/0200872 | A1 * | 10/2003 | Lin | 99/293 |
| 2003/0213370 | A1 * | 11/2003 | Hammad et al. | 99/300 |
| 2003/0222089 | A1 * | 12/2003 | Hale | 220/912 |
| 2003/0226449 | A1 * | 12/2003 | Carasso et al. | 99/279 |
| 2004/0020368 | A1 * | 2/2004 | Cai | 99/279 |
| 2004/0020922 | A1 * | 2/2004 | Alves | 219/679 |
| 2004/0118290 | A1 * | 6/2004 | Cai | 99/275 |
| 2004/0182247 | A1 * | 9/2004 | Guerrero | 99/275 |
| 2004/0244600 | A1 * | 12/2004 | Lalanne-Eygun | 99/279 |
| 2005/0051478 | A1 * | 3/2005 | Karanikos et al. | 210/469 |
| 2005/0160918 | A1 * | 7/2005 | Winstanley et al. | 99/279 |
| 2005/0172819 | A1 * | 8/2005 | Chen et al. | 99/279 |
| 2005/0236323 | A1 * | 10/2005 | Oliver et al. | 210/464 |
| 2005/0257078 | A1 * | 11/2005 | Dobranski et al. | 99/485 |
| 2005/0266122 | A1 * | 12/2005 | Franceschi | 426/77 |
| 2005/0284303 | A1 * | 12/2005 | Zell et al. | 99/279 |
| 2006/0019000 | A1 * | 1/2006 | Zanetti | 426/112 |
| 2006/0107841 | A1 * | 5/2006 | Schifferle | 99/279 |
| 2006/0159815 | A1 | 7/2006 | Crook et al. | |
| 2006/0174769 | A1 | 8/2006 | Favre et al. | |
| 2006/0196364 | A1 | 9/2006 | Kirschner | |
| 2006/0254428 | A1 * | 11/2006 | Glucksman et al. | 99/302 P |
| 2007/0175334 | A1 * | 8/2007 | Halliday et al. | 99/279 |
| 2007/0277677 | A1 * | 12/2007 | Roberg | 99/323 |
| 2009/0229471 | A1 | 9/2009 | Lun et al. | |
| 2010/0083843 | A1 * | 4/2010 | Denisart et al. | 99/295 |

(56) References Cited

U.S. PATENT DOCUMENTS

| | | | |
|---|---|---|---|
| 2010/0288131 A1* | 11/2010 | Kilber et al. | 99/295 |
| 2010/0303964 A1* | 12/2010 | Beaulieu et al. | 426/77 |
| 2011/0209623 A1 | 9/2011 | Leung et al. | |
| 2011/0274802 A1* | 11/2011 | Rivera | 426/431 |
| 2012/0207895 A1* | 8/2012 | Rivera | 426/433 |
| 2012/0207896 A1* | 8/2012 | Rivera | 426/433 |
| 2012/0276264 A1* | 11/2012 | Rivera | 426/433 |
| 2012/0285330 A1 | 11/2012 | Demiglio et al. | |
| 2012/0285334 A1 | 11/2012 | Demiglio et al. | |
| 2013/0017303 A1* | 1/2013 | Vu | 426/433 |
| 2013/0025466 A1* | 1/2013 | Fu et al. | 99/295 |
| 2013/0156897 A1* | 6/2013 | Goldstein | 426/115 |
| 2014/0245895 A1 | 9/2014 | Demiglio et al. | |
| 2014/0287105 A1* | 9/2014 | Husband et al. | 426/115 |

* cited by examiner

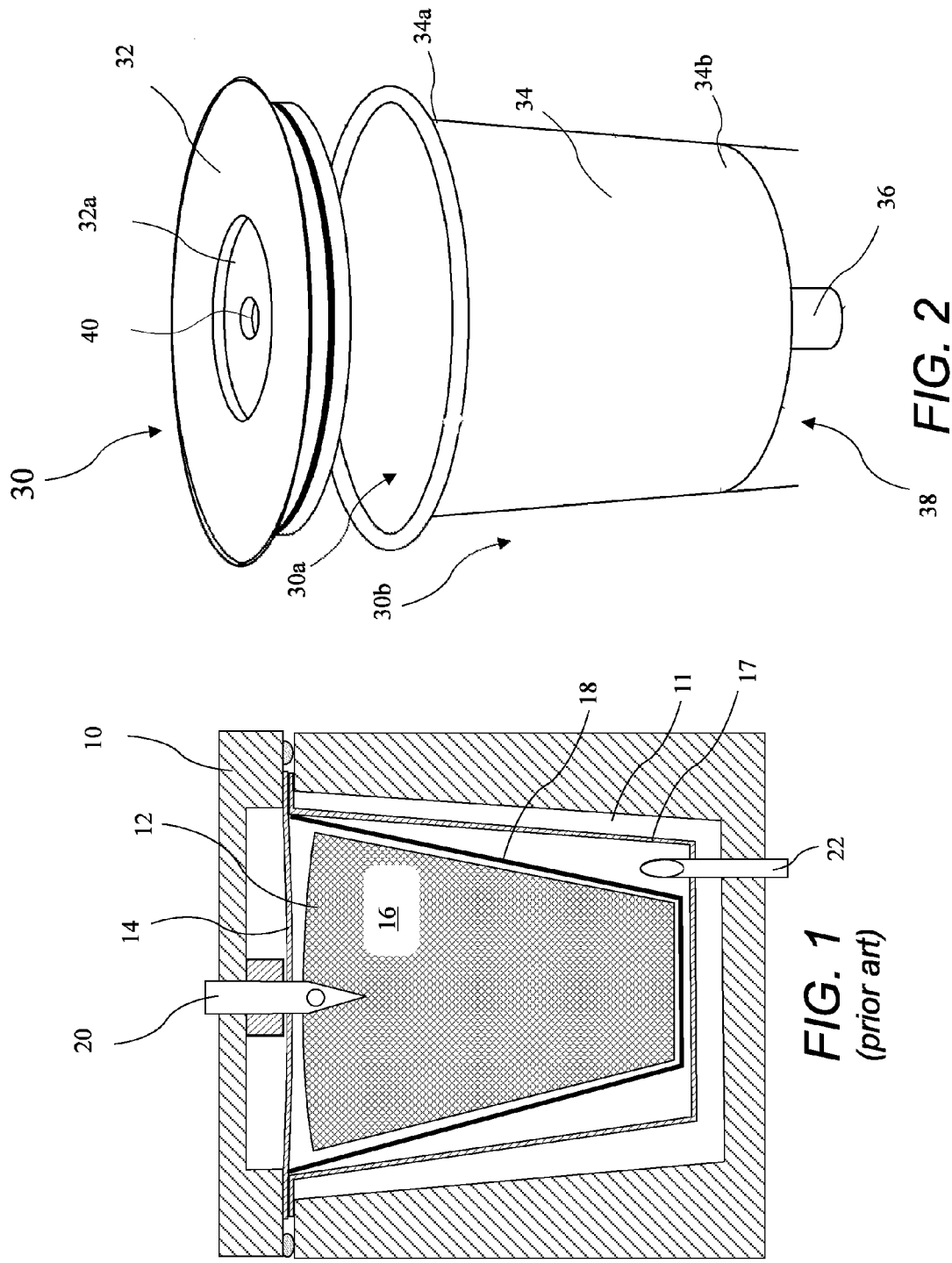

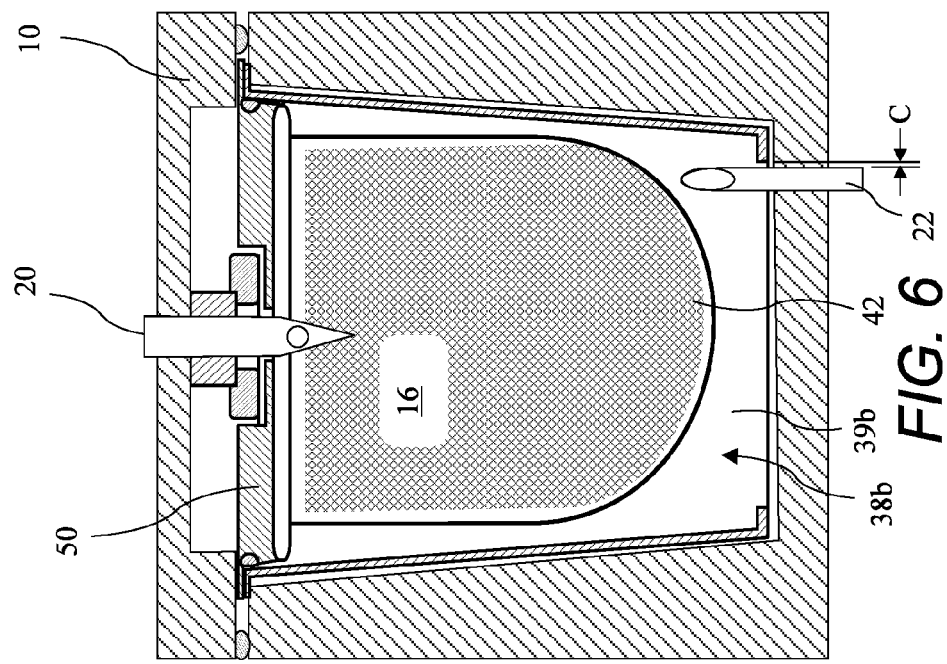
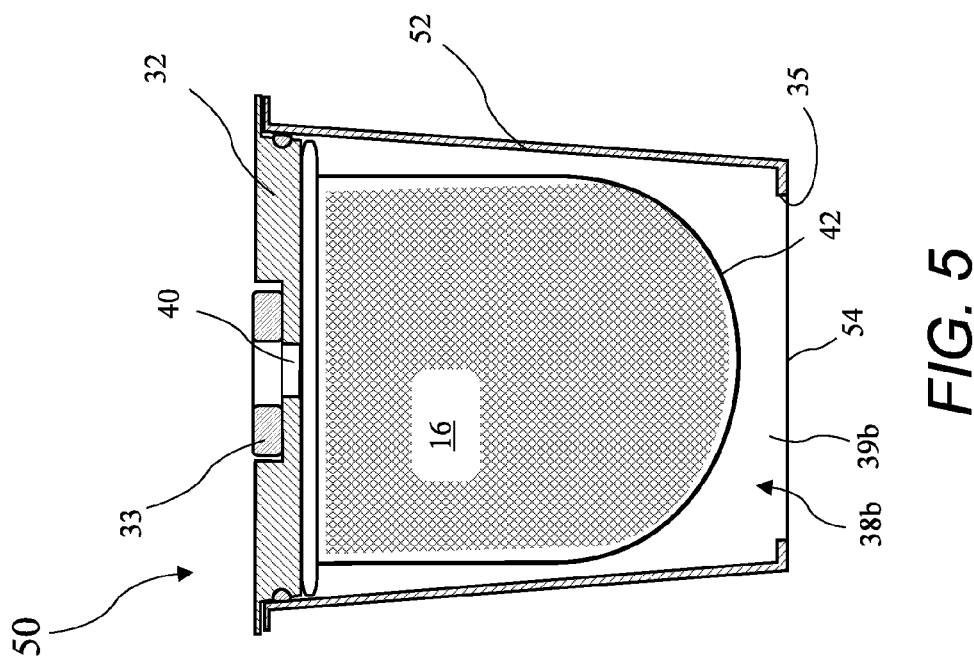

SINGLE SERVING REUSABLE BREWING MATERIAL HOLDER

The present application is a Continuation In Part of U.S. patent application Ser. No. 11/777,831 filed Jul. 13, 2007, a Continuation In Part of U.S. patent application Ser. No. 12/610,181 filed Oct. 30, 2009, and a Continuation In Part of U.S. patent application Ser. No. 12/620,584 filed Nov. 17, 2009, which applications are incorporated in their entirety herein by reference.

BACKGROUND OF THE INVENTION

The present invention relates to single serving coffee makers and in particular to a single serving reusable brewing material holder including a reusable mesh material to retain the brewing material in the holder.

Coffee is prepared in a coffee maker by measuring an amount of ground coffee into a coffee filter, closing a lid over the ground coffee, and providing a stream of hot water through the ground coffee. In recent years, single serving coffee makers have become very popular, for example, KEURIG® coffee makers. U.S. Pat. Nos. 5,325,765 and 6,708,600 disclose a housing and cooperating filter cartridge for use in a KEURIG® coffee maker. While the housing and cartridge of the '765 patent are very popular, the cost of single use cartridges far exceeds the cost of the brewing material contained in the cartridges. The '765 and '600 patents are herein incorporated by reference in its entirety.

BRIEF SUMMARY OF THE INVENTION

The present invention addresses the above and other needs by providing a single serving beverage filter cartridge which is formed by placing a single serving portion of brewing material into a reusable coffee holder having a lid and a base. The reusable coffee holder includes a recessed annular region at the bottom of a base of the holder and is insertable into a cartridge housing of a single serving coffee maker having an offset needle reaching up vertically from the base of the housing, the recessed annular region avoiding the offset bottom needle. The coffee holder defines a frustoconical exterior and includes mesh filtering material for retaining brewing material inside the coffee holder. The mesh material may be a metal mesh or plastic mesh. The reusable coffee holder is configured for use in single serving coffee makers having the offset bottom needle and designed for single use cartridges.

In accordance with one aspect of the invention, there is provided a coffee holder including a metal filter mesh material interposed between an interior and exterior of the holder to retain brewing material in the holder. The filter mesh material may be a metal or plastic mesh.

In accordance with another aspect of the invention, there is provided a coffee holder having a bottom with an annular recess. The holder fits into existing single serving coffee makers having an offset bottom needle and the annular recess provides clearance for the offset bottom needle.

In accordance with still another aspect of the invention, there is provided a coffee holder having an annular recessed region surrounding a stem. The stem extends downward from the bottom of the base. The holder fits into existing single serving coffee makers having an offset bottom needle and the annular recess around the stem provides clearance for the offset bottom needle.

In accordance with yet another aspect of the invention, there is provided a method for using a reusable coffee holder in a single serving coffee maker having an offset bottom needle. The method includes opening a lid of the reusable coffee holder, placing a single serving portion of brewing material into a holder base, closing the lid of the coffee holder, opening a coffee cartridge housing of the single serving coffee maker, placing the coffee holder into the coffee cartridge housing causing an offset bottom needle to reside in the annular recessed area in the bottom of the holder base, closing the coffee cartridge housing, and brewing a brewed beverage. The reusable coffee holder includes a holder lid, a frustoconical shaped coffee holder base, and a metal mesh filter attached to the coffee holder base and interposed between the interior and the exterior of the holder base and retaining brewing material deposited into the holder base through the holder top, and a holder lid closeable over the top of the holder base. The holder lid includes a center mating portion of the holder lid including a downward concave cavity for receiving a nozzle of a coffee maker and sealing against the coffee maker to prevent the escape of heated liquid during brewing. The a frustoconical shaped coffee holder base includes a smaller diameter bottom, a larger diameter top, an interior, an exterior, and a concave up, annular recessed area in the bottom of the holder base.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is a prior art single serving housing and filter cartridge.

FIG. 2 is a perspective view of a first single serving coffee holder according to the present invention.

FIG. 5 is a cross-sectional side view of a second single serving coffee holder according to the present invention.

FIG. 6 is a cross-sectional side view of the second single serving coffee holder according to the present invention in the prior art single serving housing.

Corresponding reference characters indicate corresponding components throughout the several views of the drawings.

DETAILED DESCRIPTION OF THE INVENTION

Figure 4:
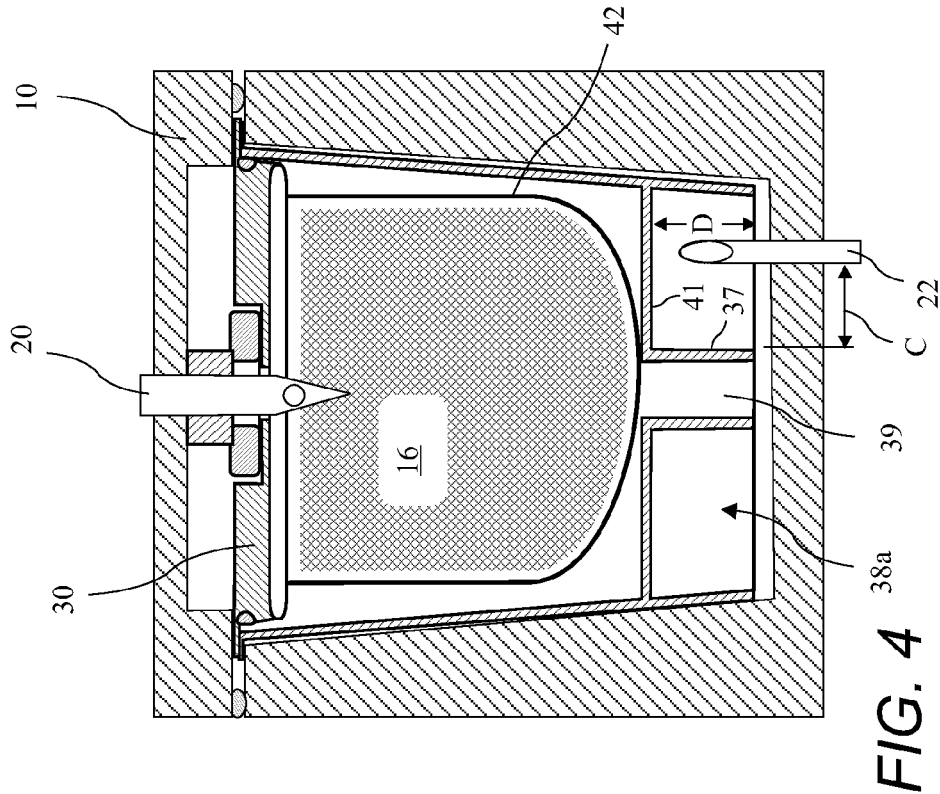
FIG. 4 is a cross-sectional side view of the first single serving coffee holder according to the present invention in the prior art single serving housing.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A prior art single serving housing 10 of a coffee maker and single use filter cartridge 12 residing in a brewing chamber 11 of the coffee maker, disclosed in U.S. Pat. Nos. 5,325,765 and 6,708,600 (incorporated by reference above) are shown in FIG. 1. The filter cartridge 12 includes a pierceable shell 14 and contains brewing material 16. An upper needle 20 penetrates the top of the shell 14 to inject heated water into the cartridge 12 and an offset bottom needle 22 penetrates the base 12 of the shell 14 and receives the brewed drink produced in the cartridge 12 and carries the brewed drink from the brewing chamber when the housing 10 is closed on the cartridge 12. A single use disposable filter cartridge sold under the trademark K-CUP® has a top edge with a diameter of about 1.8 inches, a height of about 1¾ inches, and a frustoconical shape with a base smaller than the top edge. The base of the K-CUP cartridge is generally being about 1.45 inches in diameter.

A perspective view of a first single serving coffee holder 30 according to the present invention is shown in FIG. 2. The coffee holder 30 includes a lid 32 and a base 34. The base 34 includes a larger diameter top 34a and a smaller diameter bottom 34b and is generally frustoconical in shape. A passage 40 in the lid 32 is provided for the needle 20. The bottom 34b of the base 34 includes a recess (for example, a mouth) 38 formed prior to insertion of the reusable coffee holder into the single serving coffee maker surrounding a stem 36 generally centered on the bottom 34b of the base 34. The stem 36 extends downward from the bottom of the base 34. The coffee holder 30 defines an interior region 30a and an exterior region 30b. Lid 32 may be removably attachable to the base 34, or hingedly attached to the base 34. The removable lid 32 may be an interference fit to the base 34, or the lid 32 and base 34 may have cooperating threads to threadably attach, or the lid 32 may be otherwise attached to the base 34.

Figure 3:
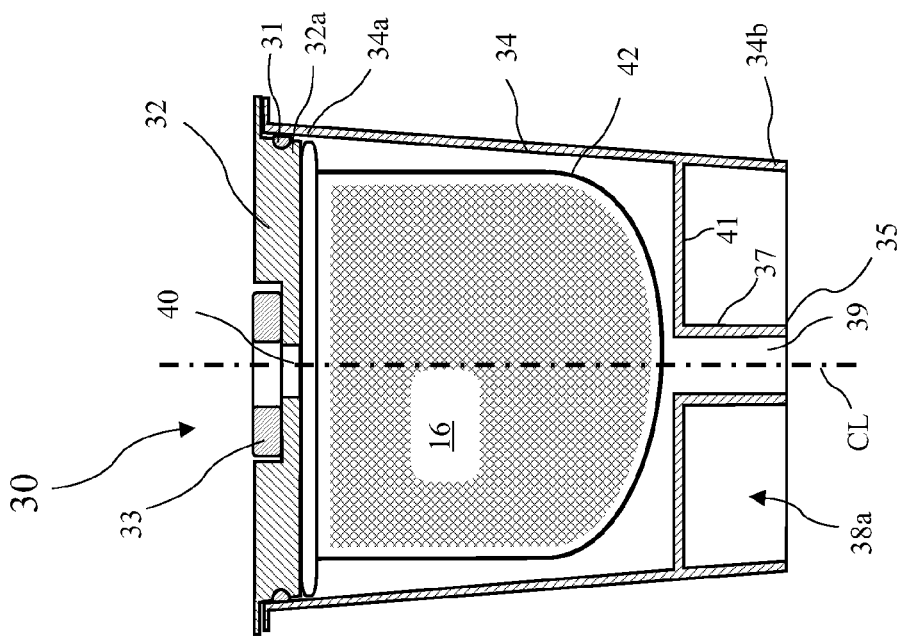
FIG. 3 is a cross-sectional side view of the first single serving coffee holder according to the present invention.

A cross-sectional side view of the first coffee holder 30 is shown in FIG. 3 and a second cross-sectional view of the first coffee holder 30 in the prior art single serving housing 10 is shown in FIG. 4. A concave down mesh filter 42 holds the brewing material 16, and retains the brewing material 16 in the interior region 30a of the coffee holder 30 separating the brewing material 16 from the exterior region 30b of the coffee holder 30 (see FIG. 2). The needle 20 reaches through the passage 40 in the lid 32 to inject hot liquid into the brewing material 16 to make a brewed drink. The recess 38 comprises an annular recess 38a providing an unobstructed vertical distance D between the holder base bottom and a lower surface of a closed ceiling 41 separating the bottom needle 22 from the interior region 30a (see FIG. 2) of the holder base and lateral clearance C between the offset bottom needle 22 and a vertical interior wall 37 bordering the recess 38a of the holder base 34, preventing contact between the offset bottom needle 22 and any part of the holder base 34. A compliant ring 33 may be included to seal against the coffee maker. A passage 39 in the holder base bottom 34 allows brewed beverage to escape from the coffee holder 30 into the brewing chamber 11 of the coffee maker while avoiding flowing through the offset bottom needle 22. The distance D is preferably between one and twenty mm and more preferably about ten mm. The lid 32 includes a ring 32a reaching downward into the holder base 34 and a O-ring 31 sandwiched between the ring 32a and the holder base top 34a. The coffee holder 30 includes a vertical centerline CL.

The housing 30 is disclosed in FIG. 2 of U.S. patent application Ser. No. 11/777,831 filed Jul. 13, 2007 by the present applicant. The present application is a Continuation In Part (CIP) of the '831 application, which '831 application is incorporated by reference above.

The mesh filter 42 is disclosed in U.S. patent application Ser. No. 12/620,584 filed Nov. 17, 2009 by the present applicant, as a nylon mesh, metal mesh, or any material capable of holding the coffee while allowing a flow of heated water through the coffee. The present application is a Continuation In Part (CIP) of the '584 application, which '584 application is incorporated by reference above. Unlike filter paper, the mesh filter may be cleaned and reused, and may be removable from the housing 30 for cleaning.

A cross-sectional side view of a second coffee holder 50 according to the present invention is shown in FIG. 5 and a cross-sectional side view of the coffee holder 50 in the prior art single serving housing 10 is shown in FIG. 6. The coffee holder 50 includes the lid 32 and a base 52. The passage 40 in the lid 32 is provided for the needle 20. The base 52 includes an annular recessed region 38b. The coffee holder 30 defines an interior region 30a and an exterior region 30b (see FIG. 2). The mesh filter 42 holds the brewing material 16, and retains the brewing material 16 in the interior region 30a of the coffee holder 50 separating the brewing material 16 from the exterior region 30b of the coffee holder 50. The needle 20 reaches through the passage 40 in the lid 32 to inject hot liquid into the brewing material 16 to make a brewed drink. A circular opening 54 in the bottom of the base 52 provides an annular recess 38b providing clearance for the lower needle 22 creating an open ceiling exposing the interior of the coffee holder to the offset bottom needle when the coffee holder resides in the brewing chamber.

The housing 50 is disclosed in FIG. 6 of U.S. patent application Ser. No. 11/777,831 filed Jul. 13, 2007 by the present applicant for use with a coffee pod including filter paper and incorporated by reference above, and the use of the mesh filter 42 is disclosed in the '584 patent incorporated by reference above. A metal or plastic reusable coffee holder is also disclosed in the '831 application.

Figure 7:
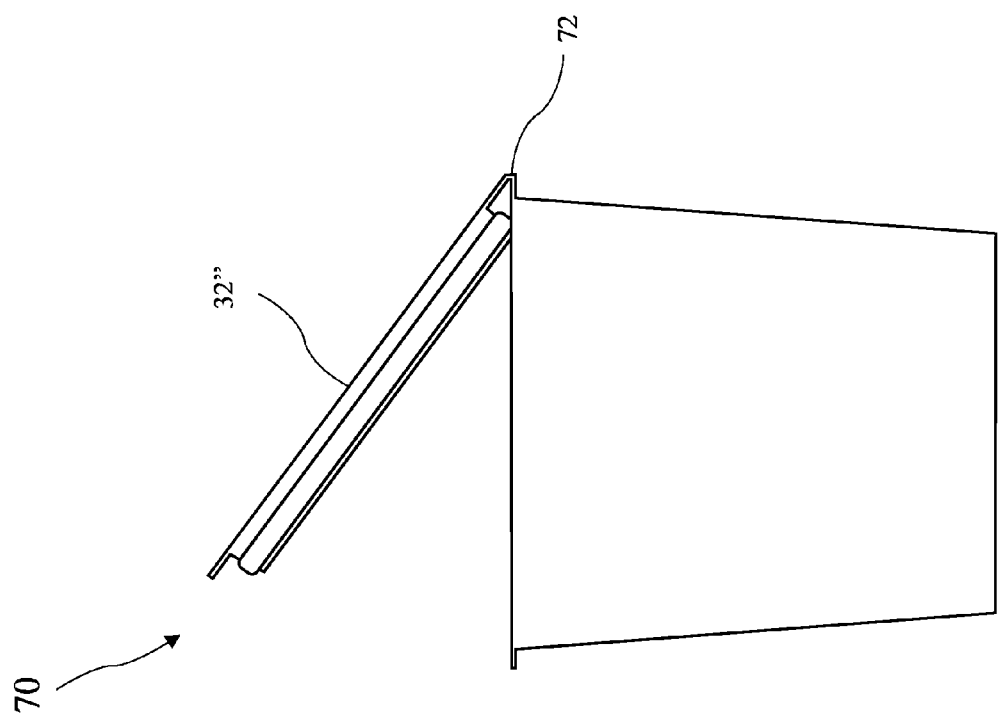

FIG. 7 shows a side view of a holder 70 having a hinged holder lid 32"

Figure 8:
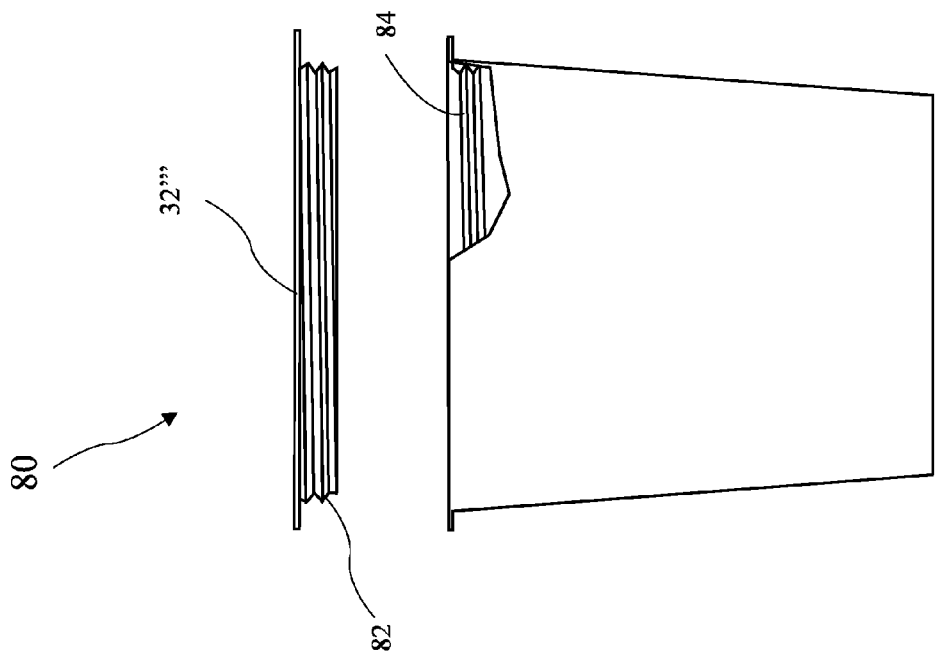

FIG. 8 shows a side view of a threaded holder and threaded holder lid according to the present invention.

While the invention herein disclosed has been described by means of specific embodiments and applications thereof, numerous modifications and variations could be made thereto by those skilled in the art without departing from the scope of the invention set forth in the claims.

I claim:

1. A beverage brewer, comprising:
a brewing chamber;
a container, disposed within the brewing chamber and adapted to hold brewing material while brewed by a beverage brewer, the container comprising:
  a receptacle configured to receive and support the brewing material; and
  a cover;
  wherein the receptacle includes
    a base, having an interior surface, an exterior surface, and a passageway in an interior area of the base, providing fluid flow through the interior surface and the exterior surface,
    at least one sidewall extending upward from the interior surface of the base, and
    at least one extension that raises the base a predetermined distance above a lower surface of the brewing chamber;
  wherein the cover is adapted to sealingly engage with a top edge of the at least one sidewall, the cover including an opening, and
  wherein the container is adapted to accept input fluid through the opening and to provide a corresponding outflow of fluid through the passageway;
an inlet port, adapted to provide the input fluid to the container; and
a needle-like structure, adapted to receive outflow fluid from the container through the base passageway;
wherein the at least one extension forms an annular recessed region below the base that is disposed to receive the needle-like structure and to provide a clearance around the needle-like structure such that the needle-like structure does not puncture the base.

2. The beverage brewer of claim 1, wherein the predetermined distance is selected such that a tip of the needle-like structure does not penetrate the exterior surface of the base.

3. The beverage brewer of claim 1, wherein the receptacle and the cover include materials such that the container is reusable.

4. The beverage brewer of claim 1, wherein the passageway has an unobstructed configuration.

5. The brewing material holder of claim 1, wherein the passageway is disposed at a position that is substantially at a center of the base.

6. The brewing material holder of claim 1, wherein the receptacle further includes a stem that extends downward below the exterior surface of the base from around a periphery of the passageway.

7. The beverage brewer of claim 1, wherein the container further comprises a mesh filter that is configured to be disposed within the receptacle and to receive and support the brewing material in the path of the fluid flow.

8. A beverage brewer, comprising:
a brewing chamber;
a container, disposed within the brewing chamber and adapted to hold brewing material while brewed by a beverage brewer, the container comprising:
a receptacle configured to receive the brewing material; and
a cover;
wherein the receptacle includes
a base, having an interior surface and an exterior surface, wherein at least a portion of the base is disposed a predetermined distance above a bottom surface of the brewing chamber, and
at least one sidewall extending upward from the interior surface of the base,
wherein the receptacle has at least one passageway that provides fluid flow from an interior of the receptacle to an exterior of the receptacle;
wherein the cover is adapted to sealingly engage with a top edge of the at least one sidewall, the cover including an opening, and
wherein the container is adapted to accept input fluid through the opening and to provide a corresponding outflow of fluid through the passageway;
an inlet port, adapted to provide the input fluid to the container; and
a needle-like structure, disposed below the base;
wherein the predetermined distance is selected to form an annular recessed region below the base to receive the needle-like structure such that a tip of the needle-like structure does not penetrate the exterior surface of the base.

9. The beverage brewer of claim 8, wherein at least one passageway of the at least one passageway is disposed in the base.

10. The beverage brewer of claim 8, wherein the receptacle also includes at least one extension that raises the at least a portion of the base the predetermined distance above the bottom surface of the brewing chamber.

11. The beverage brewer of claim 8, wherein the receptacle and the cover include materials such that the container is reusable.

12. The beverage brewer of claim 8, wherein at least one passageway of the at least one passageway is unobstructed.

13. The brewing material holder of claim 8, wherein the passageway is disposed at a position that is substantially at a center of the base.

14. The brewing material holder of claim 8, wherein the receptacle further includes a stem that extends downward below the exterior surface of the base from around a periphery of the passageway.

15. The beverage brewer of claim 8, wherein the container further comprises a mesh filter that is configured to be disposed within the receptacle and to receive and support the brewing material in the path of the fluid flow.

16. A beverage brewer, comprising:
a brewing chamber;
a container, disposed within the brewing chamber and adapted to hold brewing material while brewed by a beverage brewer, the container comprising:
a receptacle configured to receive the brewing material; and
a cover;
wherein the receptacle includes
a base, having an interior surface, an exterior surface, and a passageway in an interior area of the base, providing fluid flow through the interior surface and the exterior surface, and
at least one sidewall extending upward from the interior surface of the base,
wherein the receptacle is adapted to support the brewing material a predetermined distance above a lower surface of the brewing chamber,
wherein the cover is adapted to sealingly engage with a top edge of the at least one sidewall, the cover including an opening, and
wherein the container is adapted to accept input fluid through the opening and to provide a corresponding outflow of fluid through the passageway;
an inlet port, adapted to provide the input fluid to the container; and
a needle-like structure, disposed below the brewing material;
wherein the predetermined distance is selected to form an annular recessed region below the base such that the needle-like structure does not touch the brewing material when held by the container.

17. The beverage brewer of claim 16, wherein the receptacle also includes at least one extension that raises the base the predetermined distance above the lower surface of the brewing chamber.

18. The beverage brewer of claim 16, wherein the receptacle and the cover include materials such that the container is reusable.

19. The beverage brewer of claim 16, wherein the passageway has an unobstructed configuration.

20. The brewing material holder of claim 16, wherein the passageway is disposed at a position that is substantially at a center of the base.

21. The brewing material holder of claim 16, wherein the receptacle further includes a stem that extends downward below the exterior surface of the base from around a periphery of the passageway.

22. The beverage brewer of claim 16, wherein the container further comprises a mesh filter that is configured to be disposed within the receptacle and to receive and support the brewing material in the path of the fluid flow.

23. A beverage brewer, comprising:
a brewing chamber;
a container, disposed within the brewing chamber and adapted to hold brewing material while brewed by a beverage brewer, the container comprising:
a receptacle configured to receive the brewing material; and a cover;
wherein the receptacle includes
a base, having an interior surface, an exterior surface, and a passageway in an interior area of the base, providing fluid flow through the interior surface and the exterior surface, and
at least one sidewall extending upward from the interior surface of the base,
wherein the cover is adapted to sealingly engage with a top edge of the at least one sidewall, the cover including an opening, and
wherein the container is adapted to accept input fluid through the opening and to provide a corresponding outflow of fluid through the passageway;
an inlet port, adapted to provide the input fluid to the container; and
a needle-like structure, adapted to receive outflow fluid from the container through the base passageway; and
wherein the passageway allows the outflow fluid substantially to avoid the needle-like structure and to flow from the container.

24. The beverage brewer of claim 23, wherein the receptacle also includes at least one extension that raises at least a portion of the base a predetermined distance above a lower surface of the brewing chamber, wherein the predetermined distance is selected to form an annular recessed region below the base such that a tip of the needle-like structure does not penetrate the exterior surface of the base.

25. The beverage brewer of claim 23, wherein the receptacle and the cover include materials such that the container is reusable.

26. The beverage brewer of claim 23, wherein the passageway has an unobstructed configuration.

27. The brewing material holder of claim 23, wherein the passageway is disposed at a position that is substantially at a center of the base.

28. The brewing material holder of claim 23, wherein the receptacle further includes a stem that extends downward below the exterior surface of the base from around a periphery of the passageway.

29. The beverage brewer of claim 23, wherein the container further comprises a mesh filter that is configured to be disposed within the receptacle and to receive and support the brewing material in the path of the fluid flow.

30. A beverage brewer including a brewing chamber configured to receive a brewing cartridge, an inlet port adapted to provide an input fluid, and a needle-like structure fixed in a bottom of the brewing chamber and adapted to puncture a shell of the brewing cartridge to carry an outflow of brewed beverage from the brewing cartridge and arranged to avoid puncturing filtering material containing brewing material disposed inside the shell, the improvement comprising:
a container configured to replace the brewing cartridge, the container positionable within the brewing chamber and adapted to hold brewing material while brewed by the beverage brewer, the container including:
a receptacle configured to receive and support the brewing material, and
a cover;
wherein the receptacle includes:
a passageway providing fluid communication between an interior of the receptacle and the brewing chamber,
a base, having an interior surface and an exterior surface and configured to avoid contact with the needle-like structure, and
at least one sidewall extending upward from the interior surface of the base and configured to avoid contact with the needle-like structure;
wherein the cover is adapted to sealingly engage with a top edge of the at least one sidewall, the cover including an opening, and
wherein the container is adapted to accept the input fluid from the inlet port through the opening and to provide a corresponding outflow of fluid through the passageway such that the outflow substantially avoids the needle-like structure.

31. The beverage brewer of claim 30, wherein the receptacle and the cover include materials such that the container is reusable.

32. The beverage brewer of claim 30, wherein the receptacle also includes at least one extension that raises the base a predetermined distance above a lower surface of the brewing chamber, to form an annular recessed region below the base.

33. The beverage brewer of claim 30, wherein the passageway has an unobstructed configuration.

34. The brewing material holder of claim 30, wherein the passageway is disposed at a position that is substantially at a center of the base.

35. The brewing material holder of claim 30, wherein the receptacle further includes a stem that extends downward below the exterior surface of the base from around a periphery of the passageway.

36. The beverage brewer of claim 30, wherein the container further comprises a mesh filter that is configured to be disposed within the receptacle and to receive and support the brewing material in the path of the fluid flow.

* * * * *